United States Patent [19]
Zajac, Jr. et al.

[11] Patent Number: 5,839,770
[45] Date of Patent: Nov. 24, 1998

[54] ROBOTIC GRIPPER

[75] Inventors: Theodore S. Zajac, Jr.; Brian K. Thompson, both of Elyria, Ohio

[73] Assignee: Zaytran, Inc., Elyria, Ohio

[21] Appl. No.: 883,507

[22] Filed: Jun. 26, 1997

[51] Int. Cl.[6] .................................................. B25J 15/08
[52] U.S. Cl. ...................... 294/88; 294/86.4; 294/119.1; 901/37
[58] Field of Search .................................. 294/1.1, 86.4, 294/88, 119.1; 901/31, 37, 49, 50; 414/8, 741; 269/25, 32, 33

[56] References Cited

U.S. PATENT DOCUMENTS

| | | |
|---|---|---|
| 3,289,485 | 12/1966 | Cazalis et al. . |
| 4,591,199 | 5/1986 | Zajac . |
| 4,802,815 | 2/1989 | Funabashi et al. ........................ 414/8 |
| 4,836,048 | 6/1989 | Tori et al. ................................. 414/8 |
| 4,913,481 | 4/1990 | Chin et al. . |
| 4,972,731 | 11/1990 | Akutagawa et al. ..................... 901/50 |
| 5,000,652 | 3/1991 | Christensen et al. . |
| 5,054,834 | 10/1991 | Alessandri et al. . |
| 5,242,159 | 9/1993 | Bernstein . |
| 5,529,359 | 6/1996 | Borcea et al. ............................ 294/88 |
| 5,595,413 | 1/1997 | McGeachy et al. ...................... 294/88 |
| 5,755,475 | 5/1998 | Zajac, Jr. et al. ........................ 294/88 |

FOREIGN PATENT DOCUMENTS 45-512   2/1982   European Pat. Off. .............. 294/86.4

OTHER PUBLICATIONS

Heinrich Tools Inc. Vises Catalog (undated).
phd Inc. Grippers Catalog 922A (undated).

*Primary Examiner*—Dean Kramer
*Attorney, Agent, or Firm*—Renner, Otto, Boisselle & Sklar, P.L.L.

[57] ABSTRACT

A parallel gripper for use in automated material handling is designed for use both in a clean room environment and in an abrasive atmosphere. The gripper includes a housing with air operated pistons which drive slides mounted on the outside of the housing. The pistons are connected to the slides by drive bars that pass through purge chambers. These chambers may be held at a pressure that is above or below the ambient depending on the environment. A seal is placed between the slide and the housing, the seal being made of a material that has a low coefficient of friction and which will cold flow under pressure, for example, TEFLON. The gripper is assembled and the purge chamber pressurized so that normally no air passes by the seal. When a particle of dirt gets under the seal, the pressure difference across the seal drives the dirt in the desired direction: outward when the gripper is used in an abrasive environment or inward when the gripper is used in a clean room environment.

21 Claims, 2 Drawing Sheets

ROBOTIC GRIPPER

FIELD OF THE INVENTION

The present invention relates to grippers for use in manipulating articles, and particularly to fluid operated grippers such as are used in automated article handling equipment.

BACKGROUND OF THE INVENTION

A device for moving members into engagement with a workpiece to grip the workpiece is used in robotic and many other types of material handling equipment. Such devices are known in the trade as "grippers". One such gripper is shown in U.S. Pat. No. 4,591,199, assigned to the assignee of the present invention. In some instances the gripper is used in a clean room environment, and debris must be prevented from exiting the gripper into the clean room environment. In some instances the gripper is used in a very dirty environment, such as where hard materials such as silicon are machined and where carbide dust may be in the air. In a very dirty environment debris must be prevented from entering the gripper and causing undue wear to the moving parts of the gripper.

U.S. Pat. No. 4,913,481 discloses a known device for moving members into engagement with a workpiece for use in a clean room environment. The device disclosed in U.S. Pat. No. 4,913,481 includes housing with sliding jaws on the outside and a means for moving the jaws toward and away from each other inside the housing. The jaws include upper and lower finger sections. The upper finger sections are connected to the moving means. Each of the lower finger sections extends through an evacuated chamber within the housing. A lip seal is located between the lower finger section and a housing outer surface to preserve the lowered pressure in the evacuated chambers. The inventors named in U.S. Pat. No. 4,913,481 propose that no particles or dust created in the unit can escape into the clean room environment.

The known prior art grippers are not suitable for use in both a clean room environment and a harsh, abrasive environment. This is particularly true where lip seals have been used because lip seals are directional, being effective to prevent leakage in one direction only. Because prior grippers have been designed for single environments only, the engineering, manufacturing and inventory costs for gripper manufacturers have been double what is possible with a single gripper suitable for both environmental extremes.

In addition, there are some applications where a gripper must move between a harsh, abrasive environment and a clean room environment. An example occurs in the manufacture of electronic chips. In this process silicone wafers are sawed from a large silicone crystal. The sawing process requires a diamond abrasive which, together with the silicone dust, produces an extremely harsh environment. Once the wafer is cut from the crystal, it must be cleaned and moved into a clean room for further processing. A gripper is used to move the wafer, and it must be able to operate in both environments.

SUMMARY OF THE INVENTION

The present invention provides a fluid operated robotic gripper which is suitable for use both in extremely hostile environments where grit and abrasion are concerns and in extremely clean environments where any contamination of the gripped articles must be avoided. The gripper includes a pair of pistons linked together for symmetrical movement in opposite directions inside a bore in the gripper body in response to the appropriate application of an operating fluid. A drive bar extends from each piston through the body, and each is connected to a slide. In turn the slides provide a mounting point for any gripper finger that the particular application may require.

The gripper body is completely sealed from the surrounding environment except for chambers through which the drive bars pass, and these chambers provide an interlock which can be used to prevent the escape of air-born contaminants from the gripper into the environment (clean room use) or admission of contaminants from the environment into the gripper (harsh environment use). For clean room use the chambers are kept at a pressure that is below ambient. If any dirt particles or other contaminants from the operating fluid escape into the chambers, the reduced pressure in the chambers vacuums the contaminants away. In a harsh environment, the chambers are kept at a pressure above ambient. If any dirt particles or other contaminants try to enter the chambers, the elevated pressure within serves to blow the contaminants away.

In order to effect a seal between the slide and the gripper body, a resilient O-ring is mounted in an oval shaped recess in the gripper body, and a smooth surface of the slide runs against the O-ring. The O-ring is made of a material that will cold flow under pressure such as a fluorocarbon material, for example, PTFE, TFE or FEP. The configuration of the seal (an O-ring) as well as its shape (oval) result in a seal that can be used both to maintain a higher than ambient pressure within the chambers and a seal that can be used to maintain a lower than ambient pressure in the chambers.

DESCRIPTION OF PREFERRED EMBODIMENT

Figure 1:
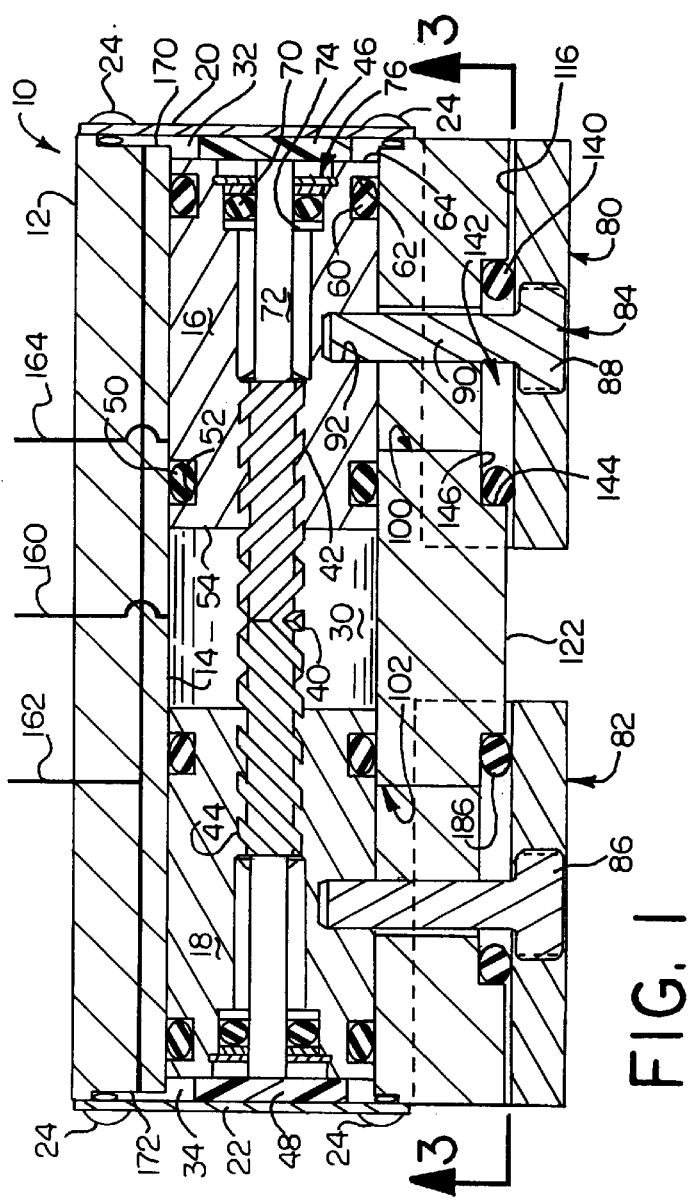
FIG. 1 is a front elevation view, partly in section, of a gripper constructed in accordance with the present invention and showing the gripper body, an opposed pair of pistons joined by a helical synchronizer, a pair of slides, drive bars which connect the slides each to one of the pistons, and seals between the slides and the gripper body.

FIG. 1 illustrates a gripper 10 constructed in accordance with the present invention. The gripper 10 is adaptable to use in a clean room environment where the emission of any sort of dust or other air born contaminants must be avoided. The gripper 10 is also adaptable to use in extremely abrasive environments where materials found in the ambient atmosphere must be excluded from the gripper in order to assure an adequate lifetime for the gripper. With suitable controls, the gripper 10 may be used to move articles between dirty and clean environments.

The gripper 10 includes a body 12 which may be made of any suitable material. Aluminum and plastic such as PET have both been used successfully. The body 12 includes a central bore 14 which extends all the way through the body 12. A pair of pistons 16 and 18 are mounted in the bore 14. The openings formed in the body 12 by the bore 14 are closed by end plates 20 and 22 and suitable seals (illustrated but not numbered). The end plates 20 and 22 are secured to the body 12 by means of machine screws 24, although any suitable fastener could be used.

As a consequence of this arrangement, there are three chambers in the bore 14. One chamber 30, called the "open" chamber, is formed between the axially inner end faces of the pistons 16 and 18. When fluid pressure is applied to the open chamber 30, the two pistons 16 and 18 move away from each other to what is termed the "open" position. The second and third chambers 32 and 34, respectively, are formed between the end plates 20 and 22 and the axially outer ends of the pistons 16 and 18, respectively. These two chambers are termed the "close" chambers because when fluid under pressure is applied to these chambers, the pistons 16 and 18 move toward each other to the "closed" position.

The movement of the two pistons 16 and 18 is kept in synchronism by means of a double helix shaft 40. The helix shaft 40 is coaxial with the bore 14 and passes through the pistons 16 and 18. The helix shaft 40 includes a pair of opposite hand, external helices 42 and 44 which meet in the axial center of the shaft. The pistons 16 and 18 include complimentary internal threads. The pistons 16 and 18 may be made of any suitable material. Bronze has been used successfully. However, because machining the internal helices to match those on the shaft 40 is difficult, a more easily machined material such as PET plastic may be preferred for the pistons 16 and 18.

When the pistons 16 and 18 move toward or away from each other, the shaft 40 rotates one way or the other. The shaft 40 is held in a precise axial position by means of bearings 46 and 48 (and shims if necessary) which are positioned between the opposite ends of the shaft 40 and the end plates 20 and 22, respectively. The bearings 46 and 48 may be made from Polyamide Imide or PET (polyethylene terephthalate). Because the shaft 40 is free to rotate but not free to move axially, the two pistons 16 and 18 are constrained to move equally and oppositely whenever pressure is applied to the open chamber 30 or to the two close chambers 32 and 34.

The pistons 16 and 18 are fitted with strategically placed O-ring seals. Only the piston 16 need be described in detail because the piston 18 is its mirror image. The piston 16 includes an O-ring seal 50 which is seated in a circumferential groove 52 formed near the axially inner end face 54 of the piston. The seal 50 prevents fluid under pressure from escaping from the open chamber 30 between the piston 16 and the bore 14.

The piston 16 also carries an O-ring 60 in a circumferential groove 62 formed near the axially outer end face 64 of the piston. When fluid under pressure is applied to the close chamber 32, the seal 60 prevents the fluid from passing between the piston and the bore 14.

Finally, the piston 16 carries an O-ring seal 70 which seals the piston against the shaft 40. The shaft 40 includes a smooth walled portion 72 at its axially outer end and the seal 70 runs against this surface. The seal 70 is received in a counterbore 74 formed along the axis of the piston 16, and a snap ring and washer arrangement 76 retains the seal 70 in place. The seal 70 prevents fluid from flowing between the open chamber 30 and the close chamber 32 along the shaft 40.

Each of the pistons 16 and 18 is connected to a slide 80 and 82, respectively, by means of a drive bar 84 and 86, respectively. Again the symmetry of the components makes description of only one necessary, the other being a mirror image. The slides 80 and 82 are provided with various holes (not shown) so that fingers (not shown) can be mounted to the slide. The fingers are not shown because typically they vary with each application of the gripper 10; that is, each user has fingers that are shaped to grip particular articles, whether they be silicone wafers for the manufacture of microprocessor chips or valves for use in automobiles.

The drive bar 84 has a head 88 which is circular in cross section and which has external threads formed on its periphery. The head 88 is threaded into an internally threaded passage in the slide 80 so that the two become a rigid assembly. The drive bar 84 also includes a cylindrical shaft 90 which extends from the head 88 upward (as viewed in FIG. 1) into the piston 16. The piston 16 has a blind, cylindrical bore 92 in which the drive bar shaft 90 is a press fit. With this arrangement, whenever the piston 16 moves to the left or the right, the motion is transmitted through the drive bar 84 to the slide 80 which moves the same amount and in the same direction.

Figure 3:
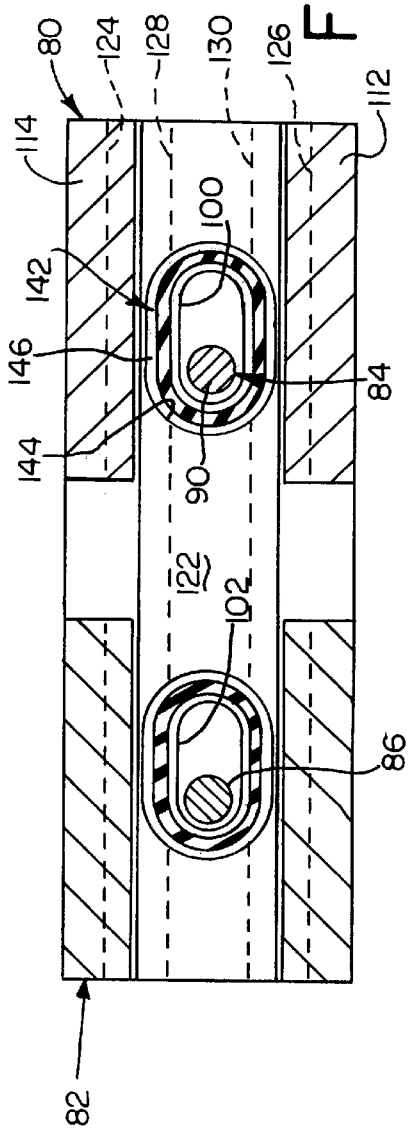
FIG. 3 is a view generally in the direction of arrows 3—3 showing the bottom of the body of the gripper of FIG. 1, the drive bars in cross section, oval recesses which receive the seals between the gripper body and the slide, and oval passages through the body through which the drive bars extend.

The body 12 includes a pair of oval slots 100 and 102 through which the drive bars 84 and 86 pass. The slots 100 and 102 are perpendicular to the bore 14 and intersect it so that the drive bars 84 and 86 may be connected to their respective pistons. As shown in FIG. 3, the slots 100 and 102 are oval to accommodate the lengthwise motion of the drive bars 84 and 86.

Figure 2:
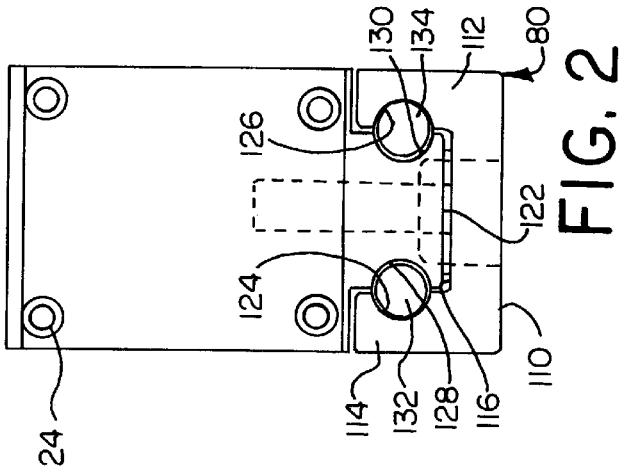
FIG. 2 is an end view of the gripper of FIG. 1 and showing an end plate, a slide, and a pair of rails mounted to the slide to support it on the body of the gripper.

As best illustrated in FIG. 2, the slide 80 is formed with a rectangular solid base portion 110 and a pair of parallel upstanding sidewalls 112 and 114. The base 110 has a flat top surface 116 which is parallel to a flat surface 122 which forms the bottom of the body 12. This is important because, as is discussed below, these two surfaces must be sealed to prevent the movement of materials between the inside of the body 12 and the ambient atmosphere.

The side walls 112 and 114 are formed with parallel semicylindrical grooves 124 and 126 running their entire length. The two grooves 124 and 126 face each other and each cooperates with a corresponding race 128 and 130 (FIG. 4) formed in the sidewalls of the body 12. Each groove 124, 126 together with its corresponding race, 128 and 130, forms a cylindrical opening.

Bearing rails 132 and 134 are proportioned to fit within the cylindrical opening. The bearing rails 132 and 134 are pinned to their respective grooves 124 and 126 by conventional roll pins (not shown) that restrain the rails against lengthwise movement and keep the rails 132 and 134 seated against respective grooves 124 and 126. The rails 132 and 134 are formed of a low friction material such as a polyamide imide, e.g., TORLON, and are a close sliding fit with the races 128 and 130 so that the slide 80 is supported for smooth movement without excessive play as the slide moves between the open and closed positions. In FIG. 2, the clearance between the rails 132 and 134 and the races 128 and 130 is greatly exaggerated.

The interface between the bottom 122 of the body 12 and the top 116 of the slide 80 is sealed by an O-ring 140. The O-ring 140 is made of a material with a low coefficient of friction and that will cold flow under pressure such as a fluorocarbon material, for example, PTFE, TFE or FEP. A counterbore 142 is formed extending upward from the bottom surface 122 of the body to receive and support the O-ring 140. The counterbore 142 tracks the perimeter of the slot 100 and provides a peripheral shoulder 144 to position the O-ring 140.

The O-ring 140 is sized so that it will fit snugly against the shoulder 144 of the counterbore 142. Before installation the O-ring 140 is circular in plan view and in cross section. After installation the peripheral shoulder 144 shapes the O-ring to surround the oval slot 100. Accordingly, once installed, the O-ring is no longer circular in plan view, but oval shaped, with two semicircular ends connected by straight sides, in the shape of a track around a football field. This shape is advantageous since the O-ring 140 is bent into a rather tight radius at each end, and the two curved ends of the O-ring are where there is most frictional force tending to roll or displace the O-ring from the counterbore 142. As compared to a circular profile, the oval shape in which the O-ring 140 is held by the counterbore 142 is more stable.

The bottom surface 146 of the counter bore keeps the O-ring 140 projecting just beyond of the bottom 122 of the body 12. Upon assembly of the gripper 10, contact with the top 116 of the slide 80 deforms the formerly circular cross section of the O-ring 140 causing a slight flat to form where the O-ring presses against the top 116 of the slide 80 and where it presses against the bottom 146 of the counterbore 142. As will be described below more fully, the O-ring 140 allows the slide 80 to move left and right (as viewed in FIG. 1) while preventing the undesirable ingress or egress of material.

Figure 5:
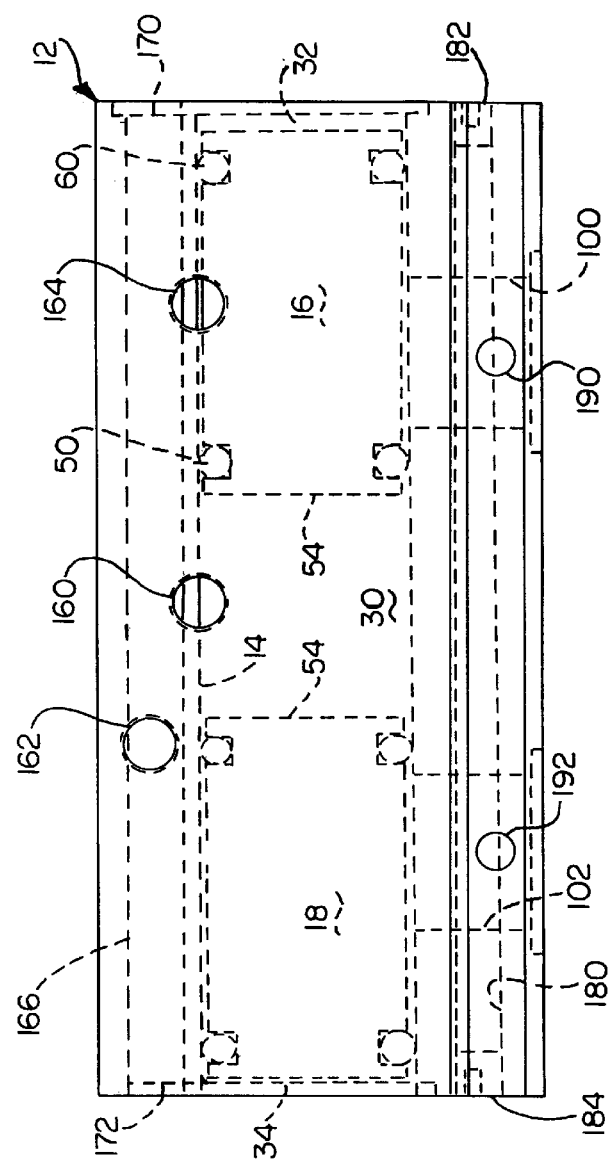
FIG. 5 is a front elevation view of the body of the gripper showing internal passages for fluid flow and showing the pistons.

FIG. 5 is a partly schematic illustration of the body 12, showing the pistons 16 and 18 in phantom, as well as the various internal passages for the flow of operating fluid to actuate the gripper 10. For simplicity, the slides, drive pins, helical shaft, end plates and other components have not been shown. The external fluid connections are an open port 160, a close port 162, and a purge port 164. These connections and passages are also shown schematically in FIG. 1.

Figure 4:
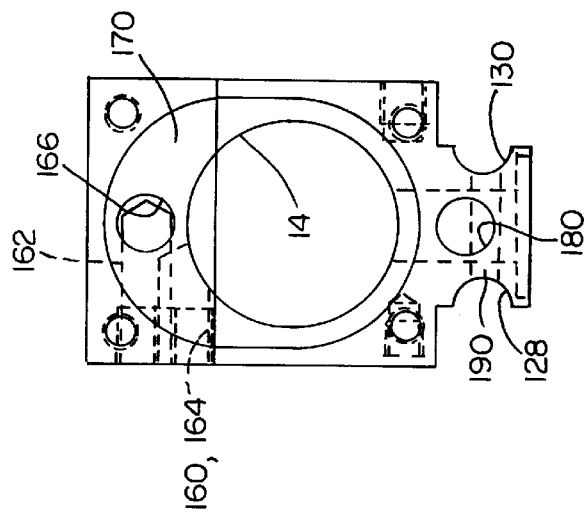
FIG. 4 is an end view of the body of the gripper showing internal passages.

The open port 160 is a threaded passage approximately along a tangent to the bore 14, as shown in FIG. 4. The open port 160 leads into the bore 14 at its axial center so that fluid under pressure, typically air, may be directed into the open chamber 30. Even when the pistons 16 and 18 are both in the fully closed position, the helical shaft 40 maintains a small gap between them so that the fluid pressure can act on the inner end faces 54 of the pistons to move them away from each other and toward the open position.

The close port 162 leads to a passage 166 which extends lengthwise of the body 12, parallel to and above the bore 14. As shown in FIG. 1, the end plates 20 and 22 are sealed against opposite end faces of the body, but shallow recesses 170 and 172 in the body 12 allow the fluid under pressure to reach from each end of the passage 166 into the adjacent close chambers 32 and 34. Therefore when fluid under pressure is applied to the close port 162, it reaches the axially outer end faces of the pistons 16 and 18 and presses the pistons toward each other.

The purge port 164 leads to a system of passages that allows the gripper 10 to be used either in a clean room environment or in an abrasive environment. The purge port 164 extends from the outside of the body 12 into the bore 14 approximately along a tangent to the bore 14. The purge port 164 is positioned axially so that it always communicates with the bore 14 between the O-ring 50 and the O-ring 60. Additionally, the length of the piston 16 is selected with respect to the length of the slot 100 so that the seals 50 and 60 to not reach the intersection of the slot 100 and the bore 14. Accordingly, no matter which of its extreme positions the piston 16 is in, there is always a fluid flow path from the purge port 164 to the space around the piston 16 between the seals 50 and 60, but neither the open chamber 30 nor the close chambers 32 and 34 are connected to the slot 100.

As noted above the slot 100 connects with the bore 14, and accordingly the purge port 164 is also in communication with the slot 100. A cylindrical purge passage 180 extends the full length of the body 12 and intersects the slots 100 and 102. The ends of the purge passage 180 are sealed with suitable plugs 182 and 184. The purge passage allows fluid flow from the purge port 164 to reach the slot 102 and hence the annular space around the piston 18 between the seals located adjacent the opposite ends of the piston.

With these passages in mind it is now possible to describe the operation of the gripper 10. When air (or other operating fluid) is introduced into the open port 160 and the close port 164 is vented to atmosphere, the pistons 16 and 18 move away from each other, taking the slides 80 and 82 with them. Reversing the connections causes the pistons 16 and 18 to move in the opposite direction.

When operating in a harsh environment, the purge port 164 is (FIG. 1) connected to a constant supply of air under pressure. This air charges the slots 100 and 102 and presses against the inside of the O-ring 140 and the corresponding O-ring 186 engaged by the slide 82. The pressure of the purge air is selected so that normally the seals 140 and 186 seal tightly and do not permit any air to escape past them into the environment. However, when a particle of dirt or other foreign material gets between, for example, the slide 80 and the O-ring 140, the O-ring distorts slightly, lifting off the surface of the top surface 116 of the slide. This small lifting causes the air pressurized from the purge port 164 to rush out, blowing the dirt particle away. The Bernoulli effect assures that for small particles the air velocity is quite large because such particles displace the O-ring 140 by only a small amount. As a result, when operating in a dirty environment, connecting the purge port 164 to a supply of air under pressure keeps unwanted particles out of the interior of the body 12.

For clean room operations, the purge port is connected to a vacuum source. In a clean room the gripper 10 is not in any danger of premature wear caused by abrasive particles in the environment. Instead, the articles being handled by the gripper are at risk from even the smallest particle of dirt which might escape from the gripper. Such a particle can be created by wear inside the gripper and by dirt in the air supply used to power the gripper. With the purge port 164 connected to a vacuum, any particles from either source are vacuumed through the purge port 164 to be removed safely from the clean environment.

It should be noted the a pair of passages 190 and 192 (FIGS. 4 and 5) cross the body 12 and intersect with the purge passage 180. These passages 190 and 192 communicate with the races 128 and 130. In a dirty environment they supply a constant potential flow of air out past the bearing rails 132 and 134. When a particle of dirt lodges under the rails, the potential flow becomes actual, blowing the particle away and so reducing wear on the rails. In a clean room environment, the rails 132 and 134 are bathed in a constant vacuum to draw in any particles.

Thus it is clear that the present invention provides a fluid operated robotic gripper 10 which is suitable for use both in extremely hostile environments where grit and abrasion are concerns and in extremely clean environments where any contamination of the gripped articles must be avoided. The gripper 10 includes a pair of pistons 16 and 18 linked together for symmetrical movement in opposite directions inside a bore 14 in the gripper body 12 in response to the appropriate application of the operating fluid. A drive bar 84, 86 extends from each piston through the body and each is connected to a slide, 80 and 82, respectively. In turn the slides provide a mounting point for any gripper finger that the particular application may require.

The gripper body is completely sealed from the surrounding environment except for chambers 100 and 102 through which the drive bars pass, and these chambers provide an interlock which can be used to prevent the escape of air-born contaminants from the gripper into the environment (clean room use) or admission of contaminants from the environment into the gripper (harsh environment use). For clean room use the chambers 100 and 102 are kept at a pressure that is below ambient. If any dirt particles or other contaminants from the operating fluid escape into the chambers, the reduced pressure in the chambers sucks the contaminants away. In a harsh environment, the chambers 100 and 102 are kept at a pressure above ambient. If any dirt particles or other contaminants try to enter the chambers, the elevated pressure within serves to blow the contaminants away.

In order to effect a seal between the slides 80 and 82 and the gripper body 12, an oval shaped O-ring 140 is mounted in a recess 142 in the gripper body 12, and a smooth surface 116 of the slide runs against the O-ring. The O-ring is made of a material that will cold flow under pressure such as a fluorocarbon material, for example, PTFE, TFE or FEP. The configuration of the seal (an O-ring) as well as its shape (oval) result in a seal that can be used both to maintain a higher than ambient pressure within the chambers and a seal that can be used to maintain a lower than ambient pressure in the chambers.

What is claimed is:

1. An apparatus for moving members into engagement with a workpiece comprising:

a body including a surface defining a bore;

first and second pistons located in the bore and movable toward and away from each other in response to the application of fluid pressure to opposite sides of the pistons;

a first member connected to the first piston through a first opening in the body and slidable with respect to the body to move into engagement with the workpiece;

a second member connected to the second piston through a second opening in the housing and slidable with respect to the body to move into engagement with the workpiece;

resilient seals between the body and the first and second members to limit fluid flow between the first and second openings and the surrounding environment;

and a purge passage connecting the first and second openings with a third opening in the exterior of the body, the third opening being adapted to be connected selectively to one of a source of fluid under pressure and a vacuum to control the direction of movement of debris in the first and second openings.

2. The apparatus of claim 1 wherein the resilient seals have a circular cross section with flats formed by compression of the seals between the body and the first and second members.

3. The apparatus of claim 2 wherein the resilient seals have an oval shape in plan view.

4. The apparatus of claim 3 wherein the oval shape of the resilient seals has a long axis, and wherein the first and second members move along an axis in linear motion with respect to the body, and the long axis of the oval shape of the seals is generally parallel to the axis of linear motion of the first and second members.

5. The apparatus of claim 1 wherein first and second pistons each have a pair of circumferential seals limiting fluid flow past the seals along the bore through the body, the pair of seals on each piston defining an annular space along the piston between the seals of each pair, the purge passage being connected to the annular space along the length of each piston between the seals on each piston.

6. The apparatus of claim 1 wherein bore through the body is cylindrical and the first and second members slide along bearings that are generally parallel to the axis of the bore.

7. The apparatus of claim 6 including a passage connecting the purge passage with the bearings.

8. The apparatus of claim 7 wherein the bearings are plain bearings.

9. The apparatus of claim 8 wherein the body includes a bearing recess parallel to the axis of the bore and each of the first and second members includes a bearing recess, and the bearings include a friction reducing member mounted in one of the bearing recesses and slidable in the other.

10. The apparatus of claim 8 in which the body includes an opposed pair of bearing recesses extending parallel to the bore through the body, and each of the first and second members have corresponding recesses, and the bearings include friction reducing elements mounted in the corresponding recesses of the first and second members, the friction reducing elements being slidable in the bearing recesses in the body.

11. The apparatus of claim 1 wherein the body includes a surface forming a shoulder surrounding the first opening, and wherein one of said resilient seals is positioned in contact with the shoulder.

12. The apparatus of claim 11 wherein the first member slides linearly with respect to the body and has a sealing surface parallel to the direction of linear motion, the shoulder formed in the body being perpendicular to the sealing surface of the first member.

13. The apparatus of claim 12 wherein the shoulder in the body is part of a counterbore, and the counterbore includes a bottom surface perpendicular to the shoulder surface, said one of the resilient seals being squeezed between the bottom surface of the counterbore and the sealing surface of the first member.

14. The apparatus of claim 13 wherein the one of the resilient seals is generally circular in cross section with flats formed where said seal contacts the bottom surface of the counterbore and the sealing surface of the first member.

15. A gripper comprising a body, a slide outside the body and mounted for reciprocating movement along a track on the body, a fluid operated actuator within the body, a drive bar connecting the actuator and the slide, the drive bar passing through an opening in the body from the inside of the body to the outside of the body, a sealing surface formed on one of the body and the slide, the sealing surface being generally parallel to the track, a bidirectional resilient seal member mounted to the other of the slide and body, and a passage to connect the opening in the body selectively to one of a supply of fluid at higher than ambient air pressure and a supply of fluid at lower than ambient air pressure.

16. The gripper of claim 15 wherein the opening is oval and the seal surrounds the opening.

17. The gripper of claim 16 wherein the seal is mounted in a groove formed in the body which surrounds the opening.

18. The gripper of claim 17 wherein the groove is oval, and the long axis of the oval is generally parallel to the track of reciprocating movement of the slide.

19. The gripper of claim 18 wherein the groove is defined by a bottom surface generally parallel to the track and by a shoulder transverse to the bottom surface of the groove and defining the outer periphery thereof.

20. The gripper of claim 15 wherein the seal is formed of a material selected from the group of PTFE, TPE, and FEP.

21. The gripper of claim 15 wherein the seal member is TEFLON.

* * * * *